United States Patent
Park

(10) Patent No.: US 7,628,246 B1
(45) Date of Patent: Dec. 8, 2009

(54) FLEXIBLE COUPLING OF MOTOR-DRIVEN POWER STEERING

(75) Inventor: Sangdon Park, Anyang-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 12/324,010

(22) Filed: Nov. 26, 2008

(30) Foreign Application Priority Data

May 20, 2008 (KR) ...................... 10-2008-0046722

(51) Int. Cl.
*B62D 5/06* (2006.01)

(52) U.S. Cl. ...................................... 180/425

(58) Field of Classification Search ................. 180/425, 180/444; 464/87, 81, 85, 92
See application file for complete search history.

(56) References Cited

U.S. PATENT DOCUMENTS

| | | | |
|---|---|---|---|
| 6,733,039 B2 * | 5/2004 | Honda et al. ................. | 280/780 |
| 6,846,240 B2 * | 1/2005 | Andra ......................... | 464/83 |
| 7,387,574 B2 * | 6/2008 | Zimmermann et al. ......... | 464/73 |
| 7,490,696 B2 * | 2/2009 | Saruwatari et al. .......... | 180/444 |
| 2001/0053717 A1 * | 12/2001 | Geislinger .................. | 464/92 |
| 2008/0149413 A1 * | 6/2008 | Kiforiuk et al. ............. | 180/444 |
| 2008/0261705 A1 * | 10/2008 | Wahling et al. .............. | 464/87 |

FOREIGN PATENT DOCUMENTS

| | | |
|---|---|---|
| KR | 10 0645766 B1 | 11/2006 |
| KR | 10 2008 0007811 A | 1/2008 |
| KR | 10 2008 0008526 A | 1/2008 |

* cited by examiner

*Primary Examiner*—Lesley Morris
*Assistant Examiner*—Tashiana Adams
(74) *Attorney, Agent, or Firm*—Morgan, Lewis & Bockius LLP

(57) ABSTRACT

A coupling assembly for a motor-driven power steering system may include a coupling case connected to a motor shaft, a worm shaft including a flange formed at one end portion of the worm shaft; a coupling member disposed between the coupling case and the flange, wherein the coupling member is fitted in the coupling case and is rotatably coupled to the motor shaft formed in the coupling case so that the coupling member integrally rotates with the coupling case, and an elastic protrusion that integrally protrude from lateral side of the coupling member.

18 Claims, 4 Drawing Sheets

FLEXIBLE COUPLING OF MOTOR-DRIVEN POWER STEERING

CROSS-REFERENCE TO RELATED APPLICATION

The present application claims priority to Korean Application Number 10-2008-0046722 filed May 20, 2008, the entire contents of which application is incorporated herein for all purposes by this reference.

BACKGROUND OF THE INVENTION

1. Field of the Invention

The present invention relates to a motor-driven power steering system that makes it possible to prevent a noise or a rattling noise when turning the steering wheel by preventing an inner ring of a tilt bearing from moving in the axial direction of a worm shaft.

2. Description of Related Art

In general, power steering is classified into a type that uses hydraulic pressure of oil and a type that uses power of an electric motor.

The hydraulic power steering is to supply hydraulic pressure, which is made by pumping fluid by a hydraulic pump using power of the engine, in the turning direction of the steering wheel by a driver to help handling, and the motor-driven power steering (hereafter, referred to as MDPS) is to improve a steering force using an electric motor.

According to the MDPS, the electric motor automatically performs control function, depending on the traveling conditions, and accordingly, it can have improved steering performance and steering response as compared with the hydraulic power steering.

Further, the MDPS includes a worm wheel in which a steering shaft is fitted and a worm shaft that is engaged with the worm wheel, and further includes a tilt bearing that optimizes the engagement of the worm wheel and the worm shaft.

However, according to the MDPS in the related art, a dead sound, such as clatter, is made when the steering wheel that has been turned is released while a vehicle is stopped. Further, as the vehicle drives on a rough road or a rugged road, a rattling noise is made by a gap that is generated between the worm wheel and the worm shaft due to a large reaction force that is transmitted from the road surface to the steering shaft.

The above noises are made when the inner ring of the tilt bearing moves in the axial direction of the worm shaft.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a flexible coupling of a motor-driven power steering system that prevents a noise to improve reliability of the product for consumers by improving the structure such that the inner ring of the tilt bearing cannot move in the axial direction of the worm shaft.

In an aspect of the present invention, a flexible coupling assembly for a motor-driven power steering system, may include a coupling member that is fitted in a coupling case while being fitted on an end portion of a motor, and integrally rotates with the coupling case, and/or a plurality of elastic protrusions that integrally protrude from both sides of the coupling member and of which end portions support the coupling case and a flange of a worm shaft. The elastic protrusions may be integrally formed at both sides of a plurality of wings that radially protrude from the coupling member.

The elastic protrusion may be made of polyurethane.

In another aspect of the present invention, a coupling assembly for a motor-driven power steering system may include a coupling case connected to a motor shaft, a worm shaft including a flange formed at one end portion of the worm shaft, a coupling member disposed between the coupling case and the flange, wherein the coupling member is fitted in the coupling case and is rotatably coupled to the motor shaft formed in the coupling case so that the coupling member integrally rotates with the coupling case, and/or an elastic protrusion that integrally protrude from lateral side of the coupling member.

A worm shaft bearing may be formed at the other end portion of the worm shaft to rotatably support the worm shaft.

A first elastic member may be coupled to a housing and the worm shaft bearing so that the worm shaft is elastically biased toward the coupling member.

A tilting bearing may be disposed on the one end portion of the worm shaft and coupled by the flange and a locking member disposed on the worm shaft. The locking member may be coupled to a locking groove formed on outer circumference of the worm shaft. The worm shaft bearing may include an inner ring coupled to the worm shaft, an outer ring engaged with the inner ring, and/or ball disposed between the inner ring and the outer ring, wherein a curvature center of the inner ring and a curvature center of the outer ring are offset each other with a predetermined distance.

The coupling member may further include a wing radially extending thereof and the elastic protrusion is formed at a lateral side of the wing facing toward the coupling case and/or the flange.

The elastic protrusion may be integrally formed at a side of a plurality of wings that radially protrude from the coupling. The elastic protrusion may be formed at a lateral side of the wings facing toward the coupling case and/or the flange.

The elastic protrusion may be made of polyurethane.

The worm shaft may include a bush disposed at the one end portion in the worm shaft, the bush supported toward the flange by a second elastic member and one end portion of the bush receiving one end portion of the motor shaft that passes through the coupling member. The second elastic member may be disposed in the worm shaft. The one end portion of the motor shaft may be tapered.

A flexible coupling for a motor-driven power steering system according to the invention includes a body and a plurality of elastic protrusions. The body is fitted in a coupling case while being fitted on an end of a motor, and integrally rotates with the coupling case. The elastic protrusions integrally protrude from both sides of the body and of which ends support the coupling case and a flange of a worm shaft.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
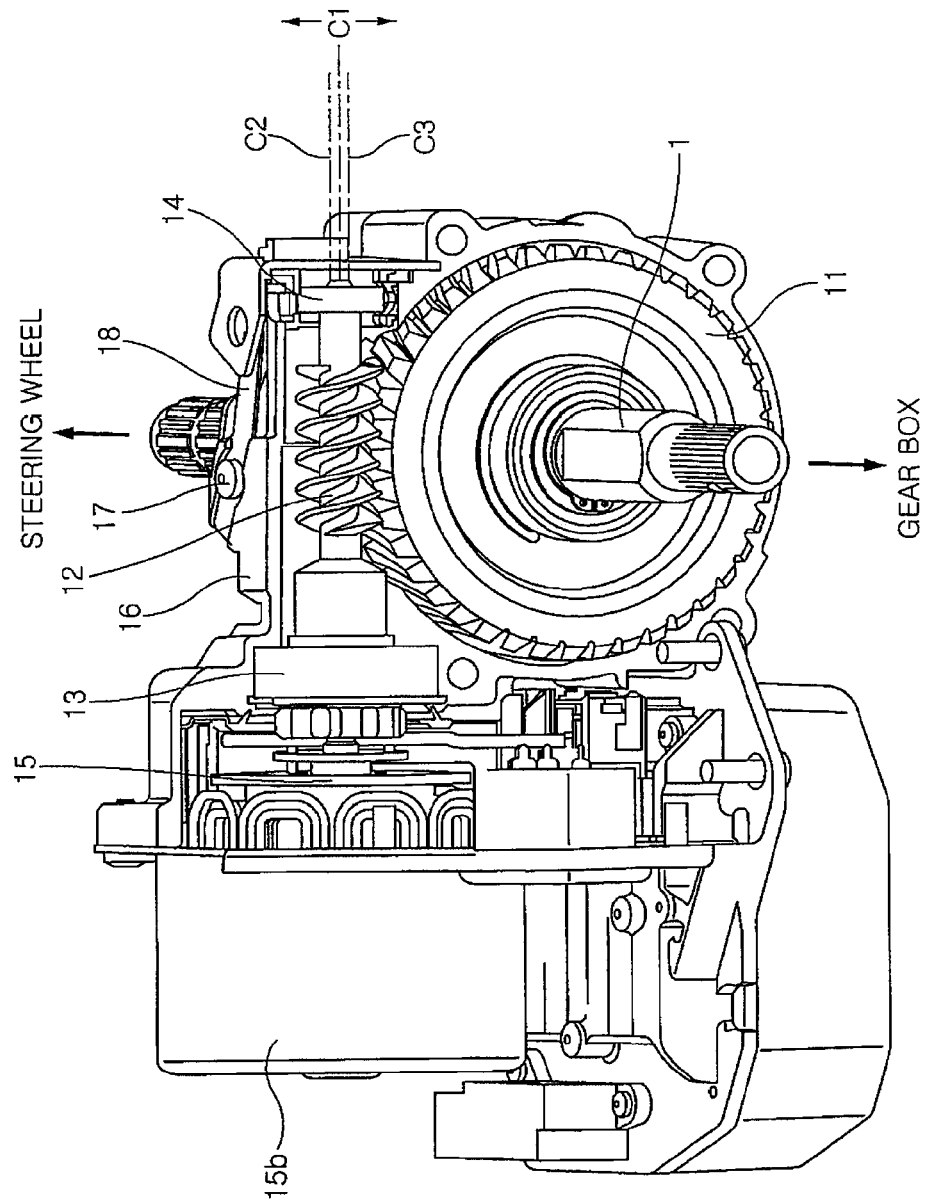
FIG. 1 is a view illustrating the configuration of an exemplary motor-driven power steering system.

A motor-driven power steering (MDPS) system according to various embodiments of the present invention, as shown in FIG. 1, includes a worm wheel 11 in which a steering shaft 1 is fitted, a worm shaft 12 that is engaged with the worm wheel 11, a tilt bearing 13 and a worm shaft bearing 14 that are fitted on both ends of worm shaft 12, a motor 15 that is connected with an end of worm shaft 12 through tilt bearing 13 and is driven by control of an electronic control unit ECU to transmit power to worm shaft 12, and a leaf spring 18 of which an end is fastened by a bolt 17 to a portion of a housing 16 that surrounding worm wheel 11 and the other end is bent in an L-shape and passes through housing 16 such that the end presses worm shaft bearing 14.

In this configuration, leaf spring 18 presses worm shaft bearing 14 to worm wheel 11 using its elastic force to remove upper or lower gap between worm wheel 11 and worm shaft 12. Accordingly, worm shaft should be able to tilt up/down C2, C3 from an axial center line C1 by a pressing force of leaf spring 18 and the component that allows worm shaft 12 to tilt is tilting bearing 13.

Figure 2:
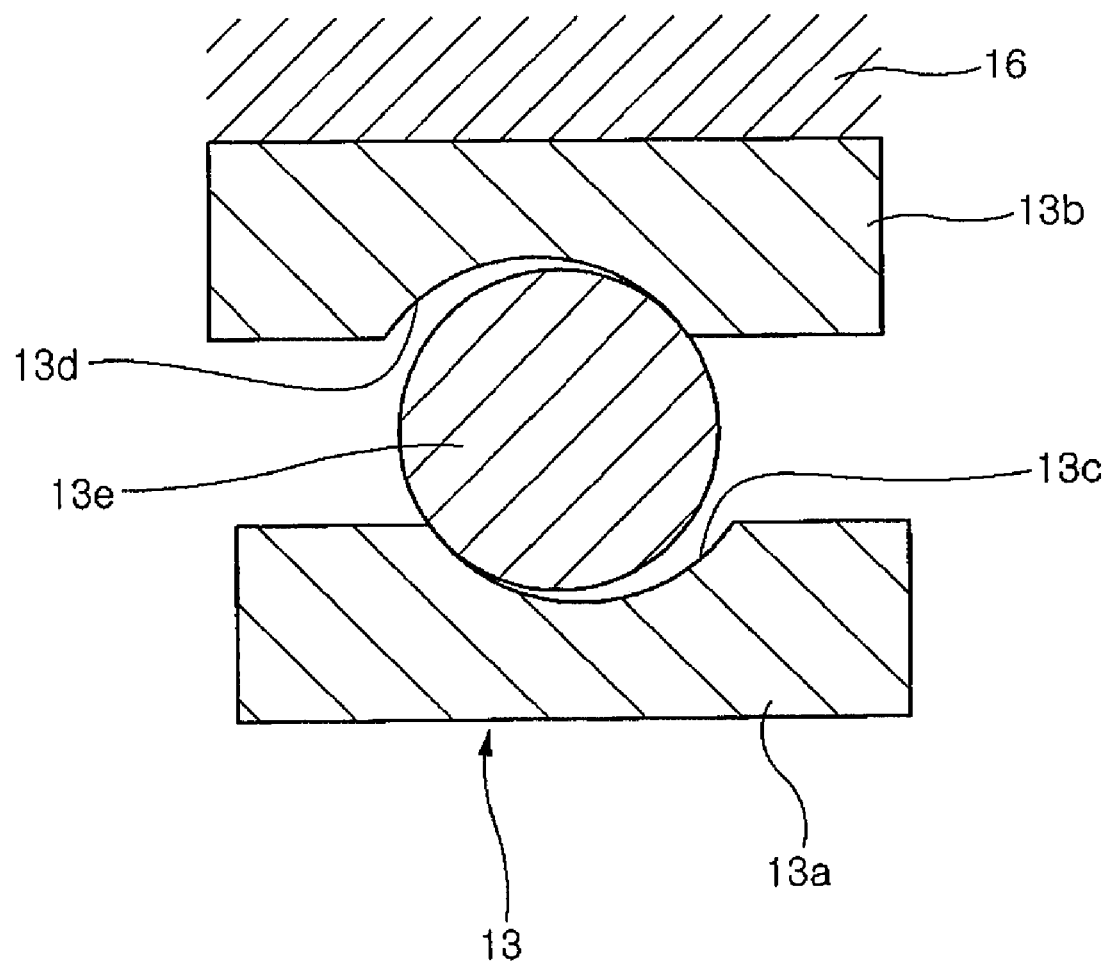
FIG. 2 is a cross-sectional view of an exemplary tilt bearing included in a motor-driven power steering system.

That is, tilting bearing 13, as shown in FIG. 2, is composed of an inner ring 13a that is fitted on the outer circumference of worm shaft 12, an outer ring 13b that is fixed to housing 16, and a plurality of ball bearings 13e that is disposed between bearing grooves 13c, 13d of inner and outer rings 13a, 13b and allows relative rotation of inner and outer rings 13a, 13b.

In the above configuration, bearing grooves 13c, 13d of inner and outer rings 13a, 13b are formed in an elliptical shape that is larger than ball bearings 13e, such that tilting bearing 13 allows worm shaft 12 to tilt.

Figure 3:
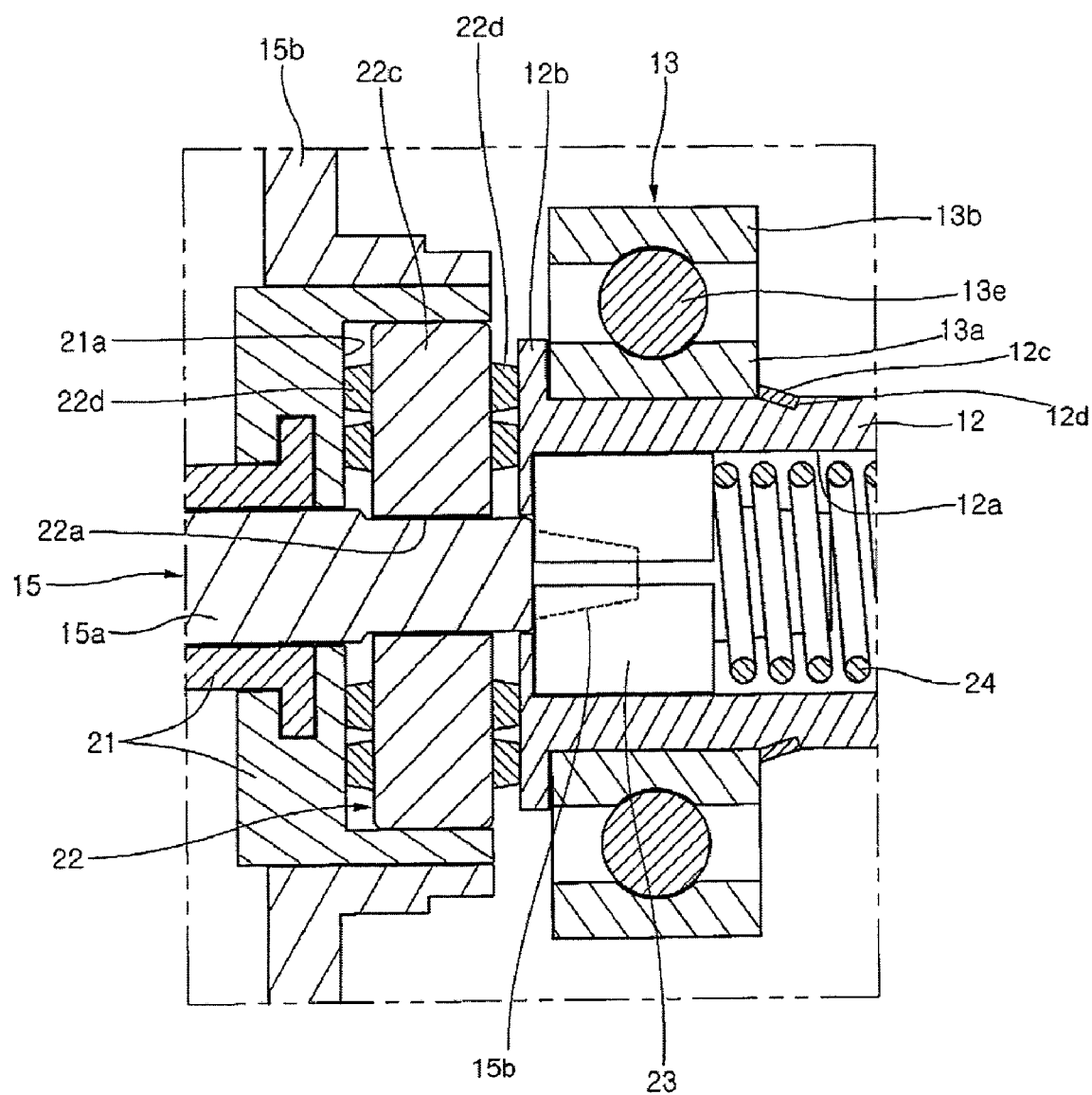
FIG. 3 is a cross-sectional view illustrating that a worm shaft is positioned by a flexible coupling according an exemplary embodiment of the present invention.

On the other hand, the connecting structure of worm shaft 12, tilting bearing 13, and motor 15 in MDPS is described in more detail with reference to the enlarged cross-sectional view shown in FIG. 3.

Motor 15 includes a motor shaft 15a and a motor case 15b, and a coupling case 21 is fitted on motor shaft 15a by serration and integrally rotates with motor shaft 15a.

Motor case 15b is combined with housing 16 of the MDPS.

A case groove 21a is formed on a side facing worm shaft 12 of coupling case 21 and a flexible coupling 22 is disposed in case groove 21a.

Flexible coupling 22 is fitted between coupling case 21 and worm shaft 12 while being fitted on an end of motor shaft 15a to transmit rotational power of coupling case 21 to worm shaft 12.

Figure 4:
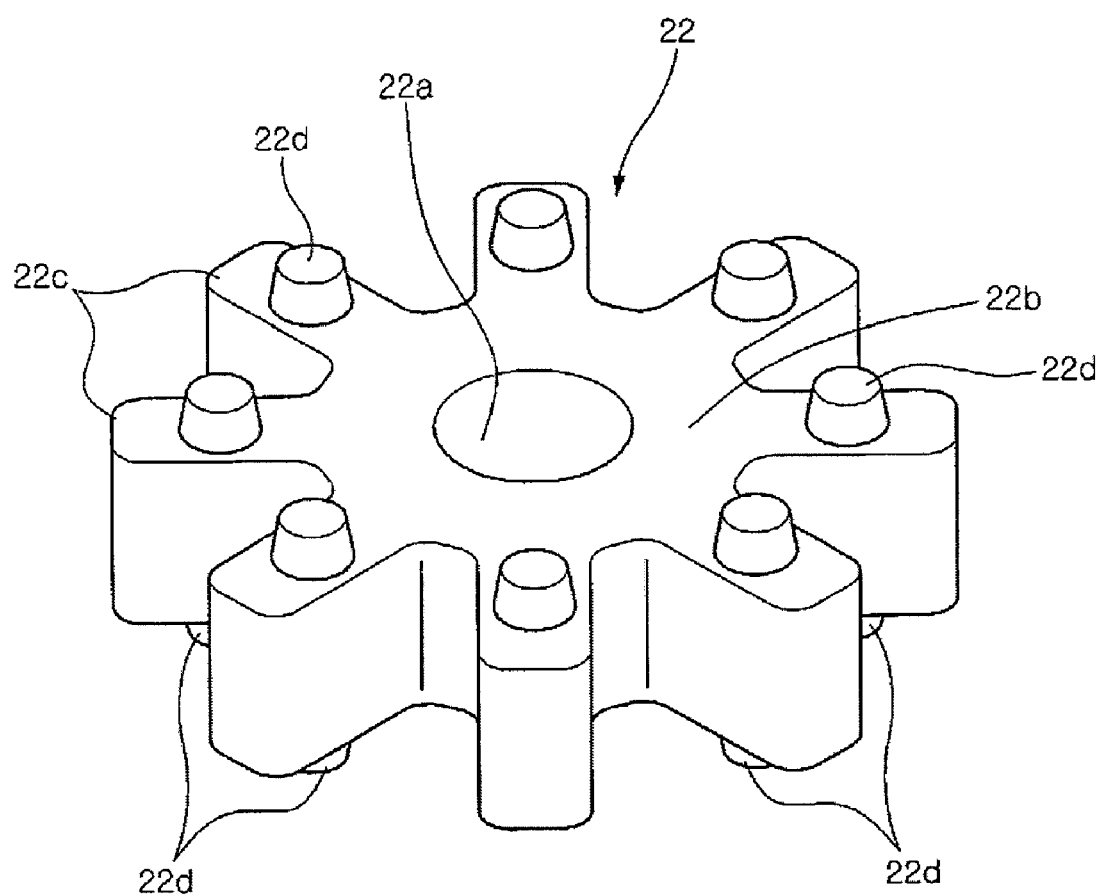
FIG. 4 is a perspective view of a flexible coupling according to an exemplary embodiment of the present invention.

Further, flexible coupling 22, as shown in FIG. 4, is composed of a body 22b having a motor shaft hole 22a at the center to receive motor shaft 15a and a plurality of wings 22c radially protruding from body 22b, in which an elastic protrusions 22d are formed at both lateral sides of each wing 22c. In various embodiments of the present invention, the elastic protrusion may be made of polyurethane.

For example, eight wings 22c are provided as shown in FIG. 4 and eight grooves are correspondingly formed between wings 22c. Further, four case protrusions which are inserted in the grooves across one groove between wings 22c and four shaft protrusions which are inserted in the other four grooves where the case protrusions are not inserted is formed on worm shaft 12.

Therefore, coupling case 21 and worm shaft 12 are connected through flexible coupling 22, such that the rotational power can be transmitted from motor shaft 15a to worm shaft 12 through coupling case 21 and flexible coupling 22.

After flexible coupling 22 is fitted on motor shaft 15a, worm shaft 12 is fitted on the end of motor shaft 15a that passes through flexible coupling 22.

A shaft groove 12a is formed longitudinally through worm shaft 12 and motor shaft 15a is inserted in shaft groove 12a and a flange 12b that radially extends is formed at the end through which motor shaft 15a is inserted.

Accordingly, when worm shaft 12 is fitted on motor shaft 15a, elastic protrusions 22d of flexible coupling 22 support case groove 21a of coupling case 21 and flange 12b of worm shaft 12.

A bush 23 that is composed of a plurality of cut pieces is fitted on motor shaft 15a in shaft groove 12a of worm shaft 12 and receives an elastic force toward motor shaft 15a by a spring member 24 displaced in longitudinal direction of the worm shaft 12. One end portion of the motor shaft 15a includes a tapered end portion 15b so that the bush 23 and the motor shaft 15a can be more tightly coupled each other.

Bush 23 is supported by flange 12b of worm shaft 12 against the elastic force of spring member 24. Accordingly, as flange 23b of worm shaft 12 supports bush 23 against the elastic force of spring member 24, worm shaft 12 moves to flexible coupling 22, such that a gap may be reduced in the axial direction in the engagement of worm shaft 12 with worm wheel 11.

Inner ring 13a of tilting bearing 13 is fitted around the outer circumference of worm shaft 12 and a lateral side of inner ring 13a is supported by flange 12b of worm shaft 12 and a locking member 12c.

Accordingly, according to various embodiments of the present invention, elastic protrusions 22d of flexible coupling 22 press flange 12b of worm shaft 12 and flange 12b presses inner ring 13a of tilting bearing 13 in the axial direction of worm shaft 12. Further the inner ring 13a is supported by the locking member 12c positioned in opposite direction of flange 12b with respect to the tilting bearing 13 and the locking member 12c is engaged in the locking groove 12d formed at the worm shaft 12, such that inner ring 13a cannot move in the axial direction of worm shaft 12 by the flange 12b and the locking member 12c.

As a result, as inner ring 13a of tilting bearing 13 cannot move in the axial direction of worm shaft 12, it is possible to prevent a dead sound, such as clatter, when the steering wheel that has been turned is released.

In detail, when the steering wheel that has been turned is released, a force that makes worm shaft 12 move in the axial direction is applied to worm shaft 12 by rotation of worm wheel 11, in which because elastic protrusions 22d of flexible coupling 22 support worm shaft 12 in the axial direction, worm shaft 12 cannot move in the axial direction and accordingly inner ring 13a of tilting bearing 13 that is fitted on worm shaft 12 cannot move in the axial direction of worm shaft 12. As a result, it is possible to prevent a dead sound, such as clatter, when the steering wheel that has been turned is released.

Further, according to various embodiments of the present invention, it is possible to prevent a rattling noise.

That is, when a vehicle drives on a rough road or a rugged road, a large reaction force is transmitted from the road surface to the steering shaft, such that worm wheel 11 is rotated and a force that makes worm shaft 12 in the axial direction is applied to worm shaft 12.

In this condition, inner ring 13a of tilting bearing 13 can also not move in the axial direction of worm shaft 12 because elastic protrusions 22d of flexible coupling 22 support worm shaft in the axial direction. Accordingly, it is possible to effectively prevent a rattling noise.

In brief, it is possible to prevent a loud noise that is generated when a steering wheel that has been turned is released or a large reaction force is transmitted from the road surface to a steering shaft, by preventing the worm shaft and an inner ring of a tilting bearing from moving in the axial direction using the elastic protrusions formed of the flexible coupling.

Unless flexible coupling 22 is provided with elastic protrusions 22d as in this exemplary embodiment of the present invention, it is possible to support worm shaft 12 in the axial direction such that a loud noise is made by inner ring 13a of tilting bearing 13 that moves in the axial direction 12 when the steering wheel that has been turned is released or a large reaction force is transmitted from the road surface to the steering shaft.

Therefore, it is possible to improve the interior quiet by preventing a noise in the MDPS and increase reliability of the product for consumers.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A flexible coupling assembly for a motor-driven power steering system, comprising:
   a coupling member that is fitted in a coupling case while being fitted on an end portion of a motor, and integrally rotates with the coupling case; and
   a plurality of elastic protrusions that integrally protrude from both sides of the coupling member and of which end portions support the coupling case and a flange of a worm shaft.

2. The flexible coupling assembly as defined in claim 1, wherein the elastic protrusions are integrally formed at both sides of a plurality of wings that radially protrude from the coupling member.

3. The flexible coupling assembly as defined in claim 1, wherein the elastic protrusion is made of polyurethane.

4. A coupling assembly for a motor-driven power steering system, comprising:
   a coupling case connected to a motor shaft;
   a worm shaft comprising a flange formed at one end portion of the worm shaft;
   a coupling member disposed between the coupling case and the flange, wherein the coupling member is fitted in the coupling case and is rotatably coupled to the motor shaft formed in the coupling case so that the coupling member integrally rotates with the coupling case; and
   a plurality of elastic protrusions that integrally protrude from both sides of the coupling member, wherein end portions of the elastic protrusions support the coupling case and the flange of the worm shaft.

5. The coupling assembly as defined in claim 4, wherein a worm shaft bearing is formed at the other end portion of the worm shaft to rotatably support the worm shaft.

6. The coupling assembly as defined in claim 4, wherein a first elastic member is coupled to a housing and the worm shaft bearing so that the worm shaft is elastically biased toward the coupling member.

7. The coupling assembly as defined in claim 4, wherein a tilting bearing is disposed on the one end portion of the worm shaft and coupled by the flange and a locking member disposed on the worm shaft.

8. The coupling assembly as defined in claim 7, wherein the locking member is coupled to a locking groove formed on outer circumference of the worm shaft.

9. The coupling assembly as defined in claim 7, wherein the worm shaft bearing comprises:
   an inner ring coupled to the worm shaft;
   an outer ring engaged with the inner ring; and
   ball disposed between the inner ring and the outer ring, wherein a curvature center of the inner ring and a curvature center of the outer ring are offset each other with a predetermined distance.

10. The coupling assembly as defined in claim 4, wherein the coupling member further comprises a wing radially extending thereof and the elastic protrusions are formed at a lateral side of the wing facing toward the coupling case and/or the flange.

11. The coupling assembly as defined in claim 4, wherein the elastic protrusions are integrally formed at a side of a plurality of wings that radially protrude from the coupling.

12. The coupling assembly as defined in claim 11, wherein the elastic protrusions are formed at a lateral side of the wings facing toward the coupling case and/or the flange.

13. The coupling assembly as defined in claim 4, wherein the elastic protrusions are made of polyurethane.

14. The coupling assembly as defined in claim 4, wherein the worm shaft comprises a bush disposed at the one end portion in the worm shaft, the bush supported toward the flange by a second elastic member and one end portion of the bush receiving one end portion of the motor shaft that passes through the coupling member.

15. The coupling assembly as defined in claim 14, wherein the second elastic member is disposed in the worm shaft.

16. The coupling assembly as defined in claim 14, wherein the one end portion of the motor shaft is tapered.

17. A power steering system comprising:
   the coupling assembly as defined in claim 1.

18. A power steering system comprising:
   the coupling assembly as defined in claim 4.

* * * * *